E. M. v. MARCHTHAL.
APPARATUS FOR CLOSING AN ELECTRIC CIRCUIT AT PREDETERMINED POSITIONS OF A COLLECTOR.
APPLICATION FILED MAR. 18, 1912.

1,054,583.

Patented Feb. 25, 1913.

UNITED STATES PATENT OFFICE.

EDUARD MAREK V. MARCHTHAL, OF VIENNA, AUSTRIA-HUNGARY, ASSIGNOR TO SIEMENS & HALSKE, A. G., OF BERLIN, GERMANY, A CORPORATION OF GERMANY.

APPARATUS FOR CLOSING AN ELECTRIC CIRCUIT AT PREDETERMINED POSITIONS OF A COLLECTOR.

1,054,583.   Specification of Letters Patent.   Patented Feb. 25, 1913.

Application filed March 18, 1912. Serial No. 684,455.

*To all whom it may concern:*

Be it known that I, EDUARD MAREK VON MARCHTHAL, a subject of the Emperor of Austria-Hungary, and residing at Vienna, Austria-Hungary, have invented certain new and useful Improvements in Apparatus for Closing an Electric Circuit at Predetermined Positions of a Collector, of which the following is a specification.

My invention relates to apparatus for closing an electric circuit at predetermined positions of a collector.

Devices are known for closing a circuit at a predetermined selective position of a shaft, e. g. for telegraphic apparatus, automatic typewriting, type-setting, type-casting and other machines. Well-known devices of this type comprise a number of switches and a collector driven by the shaft. The segments of the collector, the brushes sliding on it and the switches are so connected with one another that when the switches are in a predetermined position the collector must be in a predetermined position under the brushes in order to close the circuit.

A primary object of my invention is to provide improved apparatus of this type. To this end, I make the number of switches as small as possible, the collector and the connecting lines as simple as possible, and the positions of the shaft in which a circuit can be closed as numerous as possible. I obtain these advantages by arranging that the connecting lines from the switches do not lead, as in well-known apparatus, to the brushes of the collector, but to the segments thereof, the collector being stationary and the brushes rotating.

One illustrative embodiment of my invention and a modification thereof are represented as an example in the accompanying drawing, wherein:—

Figure 1:
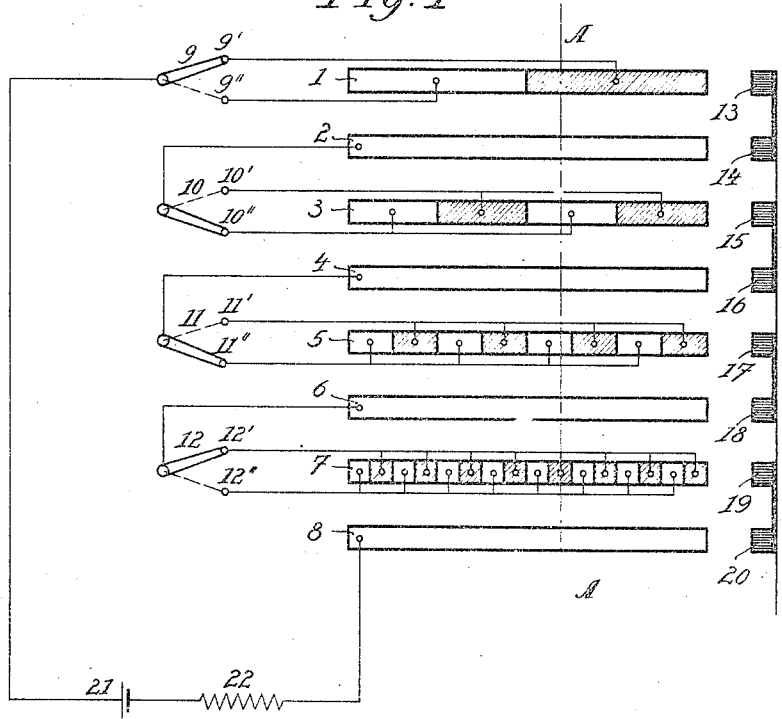
Figure 2:
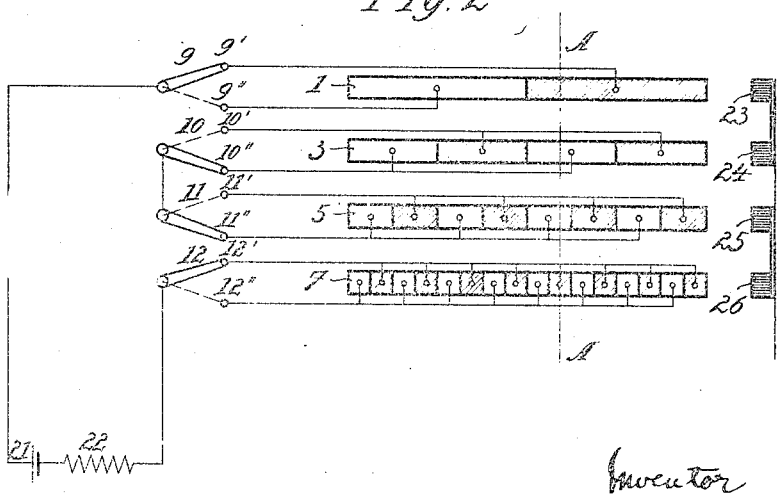

Figure 1 is a diagram showing in projection one form of collector comprised in my improved apparatus, and Fig. 2 is a like view of the modified apparatus.

Referring firstly to Fig. 1, a group of four double-throw switches 9, 10, 11, 12 serves for setting a circuit. Lines lead in pairs from the two contact-pieces of each switch to the segment rings of the collector, as clearly shown. The collector comprises eight rings 1 to 8 on which slide eight brushes 13 to 20. These are insulatedly mounted on an arm rotating with the shaft and slide over the stationary collector, and are electrically connected together in pairs. The current flows from the battery 21 to the switch-arm 9 and according to the position of the latter for the time being over the pole 9' or 9" to the ring 1 whose segments are connected with these two poles. The current then flows over the pair of brushes 13 and 14 and the slip ring 2 to the switch-arm 10. The current flows correspondingly from this and the next switch-arms until it arrives at the ring 8 whereupon it returns over the resistance 22 to the battery 21. The collector rings 2, 4, 6, 8 which are connected with the switch-arms each consists of one piece; the rings 1, 3, 5, 7, on the contrary, are subdivided into segments which are alternately connected to the one or other pole of a double-throw switch. The rings are so divided into individual segments that for each position of the switches there is one position of the brush-arm over the collector in which the circuit is closed. The arrangement is best when each ring is divided into twice as many equal segments as the preceding ring, as is shown in the drawing, in other words if the number of segments in each succeeding ring increases in geometrical progression. In the position of the switches shown in the drawing a circuit is closed when the brushes are located in the line A—A.

Referring now to Fig. 2, the apparatus is materially simplified when the current from the first ring of the collector does not flow over an undivided ring to the next switch-arm, but is conducted over the next ring subdivided into segments to the poles of the next switch. The undivided rings are here omitted as also lines connecting the switch-arms with the collector. In this illustrative embodiment, in which the switches 10 and 11 are shown thrown over, a circuit is closed when the brushes are located in the line A—A; the current then flows as follows:—from the battery 21 to the switch 9, over its pole 9' to the second segment of the first ring 1, over the pair of brushes 23, 24 to the third segment of the ring 3, hence over the switches 10 and 11 to the fifth segment of the ring 5, over the pair of brushes 25 and 26 to the tenth segment of the ring 7 and over the switch 12 and the commonly used resistance 22 to the battery.

I claim:—

1. In an apparatus of the character described, for closing an electric circuit in predetermined positions of a collector, the combination with a number of double throw switches, of a collector comprising a like number of slip rings divided into segments, a like number of pairs of lines, each line connecting alternate segments of a slip ring with one of the poles of the corresponding switch, and a like number of brushes adapted to slide over said slip rings and having suitable connections to electrically connect said rings in series with said switches, the number of segments in each successive slip ring increasing in geometrical progression whereby one brush slides over one segment of its slip ring while another brush slides over two segments of the successive slip ring.

2. In apparatus of the character described, for closing an electric circuit in predetermined positions of a collector, the combination with a number of double throw switches, of a collector comprising a like number of slip rings divided into segments, a like number of pairs of lines, each line connecting alternate segments of a slip ring with one of the poles of the corresponding switch, and a like number of brushes adapted to simultaneously slide over said slip rings and having suitable connection to electrically connect said rings in series with said switches, the number of segments in each successive ring increasing in geometrical progression.

3. In apparatus of the character described, for closing an electric circuit in predetermined positions of a collector, the combination with a number of double throw switches, of a collector comprising a like number of slip-rings divided into segments, a like number of pairs of lines, each line connecting alternate segments of a slip-ring with one of the poles of the corresponding switch, and a like number of brushes adapted to simultaneously slide over said slip-rings said brushes being electrically connected in pairs so as to bridge corresponding pairs of slip-rings, the number of segments in each successive ring increasing in geometrical progression.

4. In apparatus of the character described for closing an electric circuit in predetermined positions of a collector, the combination with a number of double throw switches, of a collector comprising a like number of slip-rings divided into segments, a like number of pairs of lines, each line connecting alternate segments of a slip-ring with one of the poles of the corresponding switch, and a brush-arm insulatedly carrying a like number of brushes electrically connected in pairs for sliding on said slip-rings, the pairs of switches, which are directly connected to two adjoining slip-rings which are not connected by a pair of brushes, being electrically connected together, the number of segments in each successive slip-ring increasing in geometrical progression, whereby one brush slides over one segment of its slip-ring while another brush slides over two segments of the successive slip-ring.

In testimony whereof I have signed my name to this specification in the presence of two witnesses.

EDUARD MAREK v. MARCHTHAL.

Witnesses:
A. FUNK,
ADA MARIA BERGER.